Patented Apr. 6, 1943

2,315,584

UNITED STATES PATENT OFFICE 2,315,584

TALL-OIL REFINING

Joseph N. Borglin, Wilmington, Del., assignor to Hercules Powder Company, Wilmington, Del., a corporation of Delaware No Drawing. Application August 16, 1941, Serial No. 407,246

14 Claims. (Cl. 260—97.5)

This invention relates to a method for the refining of tall-oil. More particularly, it relates to a method for refining tall-oil whereby undesirable metal salt impurities, visible and latent color bodies are removed therefrom.

Tall-oil is a product derived from the manufacture of wood pulp by the soda method. As recovered from the waste liquor, it is dark in color, has an unpleasant odor and contains impurities which render it unfit for many possible commercial uses. In addition, the tall-oil as recovered from the waste liquor usually contains admixed solid matter of a heterogeneous nature and small amounts of water. This solid matter is usually referred to as trash and can be removed by simple methods, as filtration, settling, etc. However, refining the crude material to improve the color has presented a perplexing problem. The color of tall-oil is very dark. This color is believed to be due in part to the presence of metal salts, especially iron salts, and in part to the presence of visible color bodies. The exact constitution or nature of these visible color bodies is unknown. Invisible or latent color bodies which develop color when the tall-oil is subjected to certain treatments, for example, saponification, also appear to be present.

It is an object of this invention to provide a method of refining tall-oil to improve its color.

It is another object to provide a method for removing metal salt impurities from tall-oil and particularly to provide a method for removing iron in the ferric form.

It is a further object to provide a method for removing visible and latent color bodies from tall-oil.

It is another object to provide a refined tall-oil having a substantially improved color.

A further object is to provide a refined tall-oil having a substantially improved odor.

Other objects of the invention will be apparent hereinafter.

The above objects may be accomplished in accordance with the present invention by subjecting crude tall-oil to treatment with oxalic acid. While treatment with oxalic acid will alone produce a refined tall-oil of improved color, it has been found most desirable to subject the tall-oil to a further treatment comprising contacting with an additional material having a capacity for absorbing color bodies therefrom. The treatment with color body absorbent material may be given prior to, simultaneously with, or subsequent to the treatment with oxalic acid. Products having the lightest color, however, are obtained when the oxalic acid treatment is given prior to treatment with a material having the capacity of absorbing color bodies from the tall-oil.

In carrying out the processes of the invention it will be desirable to first remove any solid matter and water from the tall-oil. Treatment of the tall-oil with oxalic acid will then be carried out with the tall-oil in liquid phase. Thus, liquid tall-oil itself or tall-oil dissolved in a suitable solvent therefor may be employed. Suitable solvents comprise petroleum hydrocarbon solvents, as gasoline, petroleum ether, mineral spirits, etc.; aliphatic hydrocarbons, as liquefied propane, butane, pentane, etc.; aromatic hydrocarbons, as benzene, toluene, xylene, etc.; saturated cyclic hydrocarbons, as cyclohexane, p-menthane, decahydronaphthalene, etc.; terpenes, as dipentene, α-pinene, β-pinene, turpentine, etc.; and chlorinated hydrocarbons and ethers. The oxalic acid may be added to the tall-oil in solid form or in the form of a solution. If oxalic acid is employed in solution form, the solvent employed for the oxalic acid will be one which is substantially immiscible with the tall-oil or solution thereof, or capable of being rendered substantially immiscible with the tall-oil or solution thereof. Solvents for the oxalic acid which have been found to be suitable comprise water, methyl alcohol, ethyl alcohol, butyl alcohol, acetone, ethyl acetate, etc., with water being the most preferred solvent.

The amount of oxalic acid employed, whether in solid form or dissolved in a suitable solvent, will vary depending upon the quality of the particular tall-oil being treated. However, generally between about 0.1% and about 25% by weight of oxalic acid, based on the weight of the tall-oil will be employed. The resulting solution or admixed solutions, as the case may be, is then vigorously agitated, preferably at an elevated temperature. A temperature between about 40° C. and about 200° C. may be employed, and preferably a temperature between about 60° C. and about 100° C. will be used. Where the oxalic acid is employed in solution in a solvent as hereinabove described, the two resulting immiscible phases will be separated after thorough contact of the oxalic acid with the tall-oil has been provided. The separated tall-oil phase will be substantially free of excess oxalic acid with the exception of small amounts which may be held by entrainment. If desired, this small excess may be removed by washing the tall-oil phase with water, but such procedure is not required. The foregoing treatment may, if desired, be accomplished by countercurrently contacting the tall-oil in liquid phase with a suitable oxalic acid solution. The refined tall-oil obtained as a result of the aforesaid oxalic acid treatment will be of improved color and uncontaminated with colored metal salt impurities.

In accordance with the preferred embodiments of this invention, i. e., where treatment with oxalic acid is followed by treatment with a material having a capacity of absorbing color bodies from the tall-oil, it is desirable that the tall-oil or solution thereof be substantially free of unreacted oxalic acid prior to treatment with the color body absorbent. This presents no problem in the case where the oxalic acid is employed in a solvent which is immiscible with the tall-oil or its solution, as hereinabove described. However, where solid oxalic acid has been employed, additional treatment is required to get rid of excess oxalic acid. This may be accomplished by heating at a temperature of at least 120° C. or above for a short period. Preferably, a temperature between about 150° C. and about 300° C. will be employed. Alternatively, the tall-oil or solution thereof may be treated with a liquid in which the oxalic acid is soluble, as for example, water, ethyl alcohol, etc., but preferably water. The tall-oil phase will then be separated from the oxalic acid phase.

The color body absorbents, referred to hereinbefore, which will be employed in accordance with the preferred embodiments of this invention are characterized by having the capacity for absorbing color bodies from tall-oil or solutions thereof and by being capable of substantial immiscibility with the tall-oil or solutions thereof. The term "absorbing" as used herein and in the claims includes both absorbing as by a solid, and dissolving and retaining as by a liquid, thus removing color bodies from the tall-oil or tall-oil solution, as the case may be. Suitable solid absorbents are, for example, activated carbon, activated alumina, synthetic aluminum and magnesium silicates, fuller's earth, absorbent clay, activated silica, activated bone black, etc. Reference to fuller's earth and other absorbent earths and silicates includes the earths per se or in an activated form, activated, for example, by treatment with an acid such as sulfuric, hydrochloric, etc. acids, and/or by calcination at temperatures of from 200 to 500° C. prior to use. Suitable liquid color body absorbing substances are, for example, furfural, furfuryl alcohol, a substantially immiscible chlorohydrin, as ethylene chlorohydrin, propylene chlorohydrin, etc., a phenol such as phenol, m-cresol, o-cresol, p- cresol, resorcinol, etc., usually liquefied by addition of water or a lower aliphatic alcohol, aniline, ethylene glycol, propylene glycol, butylene glycol, diethylene glycol, trimethylene glycol, glycerol, butyl glycerol, ethyl formate, methyl acetate, methyl formate, methyl orthonitrobenzoate, methyl furoate, allyl formate, monoacetin, diacetin, triacetin, ethylene glycol monoacetate, methanol, a hydroxyl alkyl amine, as triethanolamine, ethylene glycol monoethyl ether, or other immiscible glycol ether, ethylene glycol monoacetate, or other immiscible glycol ester, methyl thiocyanate, ethyl thiocyanate, acetonitrile, acetic acid, acetic anhydride, p-chloroaniline, resorcinol plus hydrosulfite, a boron compound, ethylene glycol diacetate, glycerol diacetate, resorcinol monoacetate, resorcinol diacetate, phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, methyl adipate, hydroxyhydroquinone triacetate, methyl chlorocarbonate, propylene glycol monoacetate, hydroquinone diacetate, catechol monoacetate, guaiacyl acetate, methyl glutarate, benzyl acetate, diethyl glutacoate, ethyl lactate, diethyl phthalate, ethyl anisate, methyl salicylate, methyl cinnamate, methyl mandelate, methyl succinate, ethyl propiolate, ethyl acrylate, ethyl malate, methoxybenzaldehyde, guaiacol, anisidin, nitroanisol, dichloroethyl ether, methoxy acetic acid, methyoxybenzyl alcohol, liquid sulfur dioxide, solutions of amphoteric metallic halides, nitroalcohols, nitromethane and other nitroparaffins, as well as mixtures of such refining agents which are chemically non-reactive, etc.

Treatment with a solid color body absorbent consists in suspending or agitating the absorbent in the tall-oil or solution thereof and then separating the absorbent with the absorbed color bodies from the liquid, or it may consist in passing the tall-oil in liquid phase through a mass of absorbent. The latter type of treatment is convenient as it combines contacting and separating in a single operation. In using liquid color body absorbents, the tall-oil in liquid phase and the absorbing liquid will be agitated together and then separated, as by decantation. Alternatively, the tall-oil phase and the liquid absorbent may be contacted in a continuous countercurrent extraction system.

Treatment of the tall-oil in liquid phase with either a solid or liquid color body absorbent will preferably be given at about normal or reduced temperature, for example, between about 10° C. and about 35° C. When the oxalic acid treatment and the treatment with a selective color body absorbent are given simultaneously, it is usually preferable to contact the tall-oil in liquid phase at an elevated temperature as between about 60° C. and about 100° C. and then cool to normal temperature or therebelow, as between about 10° C. and about 35° C., to insure complete separation of the liquid color body absorbing material.

The following examples illustrate several specific embodiments of the invention. In the examples, all parts and percentages are by weight unless otherwise indicated.

*Example 1*

Tall-oil, having a color of F on the rosin color scale, was dissolved in gasoline to yield a 23.6% solution. Three hundred parts of this solution were washed with 100 parts of 2% aqueous oxalic acid by agitating at 45° C. for about 15 minutes. The tall-oil phase was separated and then given one wash with 52 parts of furfural at 25° C. This was followed by four washes with 17.5 parts of furfural at 25° C. Evaporation of the resulting refined gasoline solution yielded 56 parts of refined tall-oil, having a color grade K on the rosin scale. This corresponded with a yield of 78%. This refined product upon saponification yielded soaps having a superior color as compared with soaps prepared from the crude tall-oil. The refined tall-oil had an improved odor as compared with the crude material.

*Example 2*

Three hundred parts of the same solution of tall-oil in gasoline as employed in Example 1 were heated to 60° C. and contacted with 30 parts of a solution consisting of 10% water, 2% oxalic acid and 88% resorcinol. The resulting admixture was vigorously agitated at 45° C. for about 10 minutes, and then cooled to 10° C. The tall-oil phase was then separated, washed with water and the solvent evaporated under reduced pressure. There were recovered 53 parts of product having a color grade of N+ on the rosin scale, corresponding to a yield of 77%. The refined tall-oil showed a definitely improved odor as compared with the crude material.

*Example 3*

Three hundred parts of a gasoline solution of tall-oil similar to that employed in Example 1 and 30 parts of aqueous 85% phenol were vigorously agitated at 25° C. and the tall-oil phase thereafter separated. The tall-oil phase was then washed four additional times employing 15 parts of aqueous 85% phenol for each step. The resulting tall-oil phase was then washed at 40° C. with 100 parts of aqueous 2% oxalic acid with vigorous agitation. The tall-oil phase was separated by decantation, and the solvent removed to yield 49 parts of refined tall-oil having a color grade of N on the rosin scale. This corresponded with a yield of 65%. The product had an improved odor.

The refining processes of this invention are advantageous in that they enable the production of a refined tall-oil having decidedly better color than that of the crude product. This refined product has a much more extended scope of utility. For example, light-colored soaps can be prepared with its use. The refining processes, in addition to removing colored impurities in the form of metal compounds such as ferric compounds, are responsible for the removal of visible and latent color bodies. Furthermore, the use of selective absorbents for the color bodies in tall-oil is made more efficient when the preferred procedures as described hereinbefore are employed. Finally, the refined product has an improved odor.

It will be realized that although the examples employed herein are directed to batch process operation, it is not intended to limit the processes to such operation. Continuous process operation may, if desired, be employed.

It will be understood that the details and examples hereinbefore set forth are illustrative only and that the invention as broadly described and claimed is in no way limited thereby.

What I claim and desire to protect by Letters Patent is:

1. A process for refining crude tall-oil which comprises subjecting the tall-oil in liquid phase to the action of oxalic acid.

2. A process of refining crude tall-oil which comprises subjecting the tall-oil in liquid phase to the action of oxalic acid dissolved in a solvent capable of immiscibility with the tall-oil phase.

3. A process for refining crude tall-oil which comprises the steps of subjecting the tall-oil in liquid phase to the action of oxalic acid dissolved in a solvent capable of immiscibility with the tall-oil phase, subjecting the tall-oil in liquid phase to the action of an additional material having a capacity for absorbing color bodies therefrom, and recovering the refined tall-oil.

4. A process for refining crude tall-oil which comprises subjecting the tall-oil in liquid phase to the action of a material having a capacity for absorbing color bodies therefrom, subjecting the tall-oil in liquid phase to the action of oxalic acid dissolved in a solvent capable of immiscibility with the tall-oil phase, and recovering the refined tall-oil.

5. A process for refining crude tall-oil which comprises simultaneously subjecting the tall-oil in liquid phase to the action of oxalic acid dissolved in a solvent capable of immiscibility with the tall-oil phase and to the action of an additional material having a capacity for absorbing color bodies therefrom, and thereafter recovering the refined tall-oil.

6. A process for refining crude tall-oil which comprises subjecting the tall-oil in liquid phase with oxalic acid dissolved in a solvent capable of immiscibility with the tall-oil phase, extracting the tall-oil in liquid phase with a liquid having a capacity for absorbing color bodies therefrom, and recovering the refined tall-oil.

7. A process for refining crude tall-oil which comprises subjecting the tall-oil in liquid phase to the action of oxalic acid dissolved in a solvent capable of immiscibility with the tall-oil phase, subjecting the tall-oil in liquid phase to the action of a solid having a capacity for absorbing color bodies therefrom, and recovering the refined tall-oil.

8. A process for refining crude tall-oil which comprises subjecting the tall-oil in liquid phase to the action of oxalic acid dissolved in a solvent capable of immiscibility with the tall-oil phase, subjecting the tall-oil in liquid phase to the action of furfural, and recovering the refined tall-oil.

9. A process for refining crude tall-oil which comprises subjecting the tall-oil in liquid phase to the action of oxalic acid dissolved in a solvent capable of immiscibility with the tall-oil phase, subjecting the tall-oil in liquid phase to the action of aqueous phenol, and recovering the refined tall-oil.

10. A process for refining crude tall-oil which comprises subjecting the tall-oil in liquid phase to the action of oxalic acid dissolved in a solvent capable of immiscibility with the tall-oil phase, subjecting the tall-oil in liquid phase to the action of fuller's earth, and recovering the refined tall-oil.

11. A process for refining crude tall-oil which comprises subjecting the tall-oil in liquid phase to the action of oxalic acid, removing any excess oxalic acid, and recovering the refined tall-oil.

12. A process for refining crude tall-oil which comprises subjecting the tall-oil in liquid phase to the action of oxalic acid, removing any excess oxalic acid by heating at a temperature of 120° C. or above, and recovering the refined tall-oil.

13. A process for refining crude tall-oil which comprises subjecting the tall-oil in liquid phase to the action of oxalic acid, removing any excess oxalic acid by extraction with a suitable solvent, and recovering the refined tall-oil.

14. A process for refining crude tall-oil which comprises subjecting the tall-oil in liquid phase to the action of oxalic acid, removing any excess oxalic acid, subjecting the tall-oil in liquid phase to the action of a material having a capacity for absorbing color bodies therefrom, and recovering the refined tall-oil.

JOSEPH N. BORGLIN.